Figure 1:
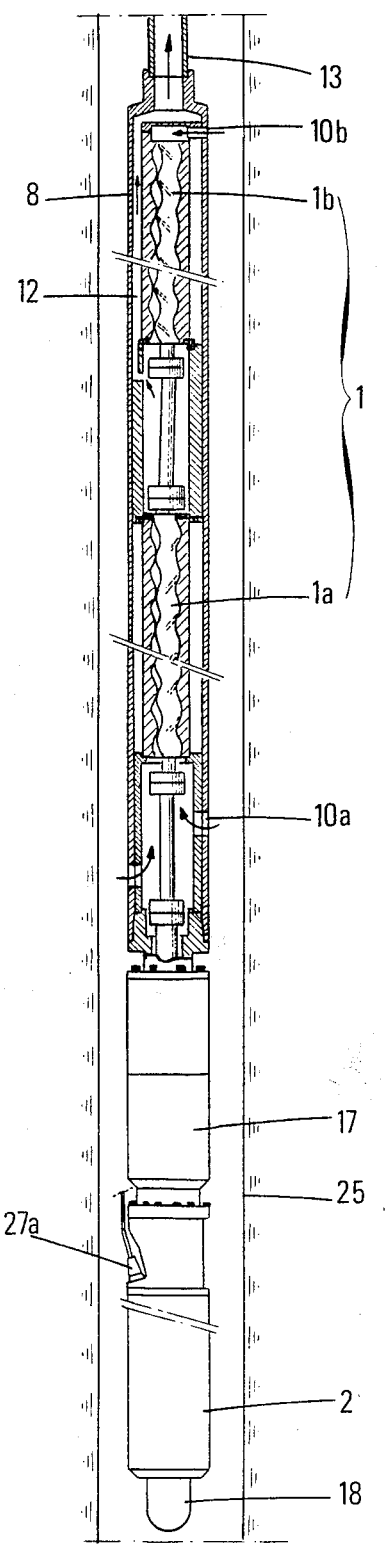

United States Patent [19]

Cholet et al.

[11] Patent Number: 4,718,824

[45] Date of Patent: Jan. 12, 1988

[54] USABLE DEVICE, IN PARTICULAR FOR THE PUMPING OF AN EXTREMELY VISCOUS FLUID AND/OR CONTAINING A SIZEABLE PROPORTION OF GAS, PARTICULARLY FOR PETROL PRODUCTION

[75] Inventors: Henri Cholet, Le Pecq; François-Jean Trocquemé, Saint Martory; Jean Garraux, Boussens, all of France

[73] Assignee: Institut Francais du Petrole, Rueil-Malmaison & Courbevoie, France

[21] Appl. No.: 649,606

[22] Filed: Sep. 12, 1984

[30] Foreign Application Priority Data

Sep. 12, 1983 [FR] France .................. 83 14589

[51] Int. Cl.$^4$ .................. F04B 49/06; F04C 15/00
[52] U.S. Cl. .................. 417/14; 417/18; 417/32; 417/45; 417/53; 417/410; 418/48
[58] Field of Search .................. 417/1, 14, 18, 32, 45, 417/53, 63, 410; 418/48

[56] References Cited

U.S. PATENT DOCUMENTS

| 2,976,807 | 3/1961 | Hill | 417/18 X |
|---|---|---|---|
| 3,203,350 | 8/1965 | Chana | 418/48 |
| 3,551,072 | 12/1970 | Zimmerly | 417/45 |
| 3,568,771 | 3/1971 | Vincent et al. | 417/45 |
| 3,677,665 | 7/1972 | Corkill | 417/410 |
| 3,751,192 | 8/1973 | Boyd | 417/45 X |
| 3,802,803 | 4/1974 | Boadanov et al. | 418/48 |
| 3,965,983 | 6/1976 | Watson | 417/36 X |
| 4,177,649 | 12/1979 | Venema | 417/43 X |
| 4,284,943 | 8/1981 | Rowe | 417/53 X |
| 4,370,098 | 1/1983 | McClain et al. | 417/53 X |
| 4,518,318 | 5/1985 | Jensen et al. | 417/53 |

FOREIGN PATENT DOCUMENTS 2124304  2/1984  United Kingdom .................. 417/18

Primary Examiner—Carlton R. Croyle
Assistant Examiner—Paul F. Neils
Attorney, Agent, or Firm—Antonelli, Terry & Wands

[57] ABSTRACT

A control process for a rotary pump which is immersed in a fluid produced by a well involves the use of a rotary pump driven by a variable speed motor and comprises the steps of acting upon the rotational speed of the motor according to a pressure difference which exists between the pressure of the fluid measured in the proximity of the pump and the production pressure of the well. The production pressure P of the well being given by the formula:

$$P = P_G - Q/I_p$$

wherein $P_G$ is equal to the pressure of the unused deposit; that is, the pressure of the fluid deposit when the fluid deposit is at rest and there is no production of the well, Q equals the pump flow rate according to the motor rotation speed and $I_p$ is equal to the well productivity indication. The apparatus for carrying out the process includes, in combination, a helicoid rotary pump and an electric motor driving the pump at a speed proportional to the frequency of the electric current fed to the motor and is provided with an arrangement for automatically adjusting the flow delivered by the pump. The adjusting arrangement includes at least one pressure sensor delivering a signal linked to the submergence level of the pump in service and a set of electric circuits for processing the measuring and control signal of the frequency of the current supplied to the motor according to the value of the measuring signal.

9 Claims, 6 Drawing Figures

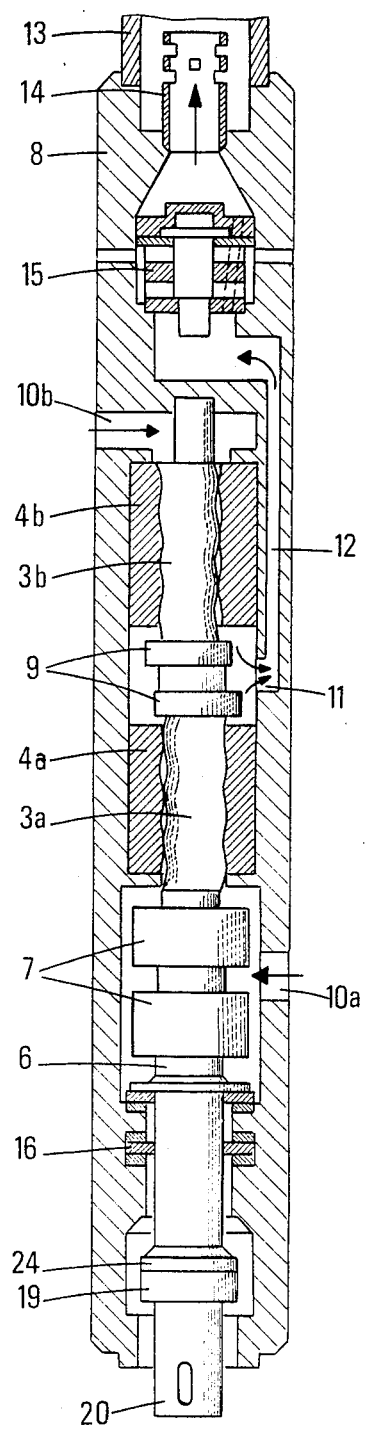
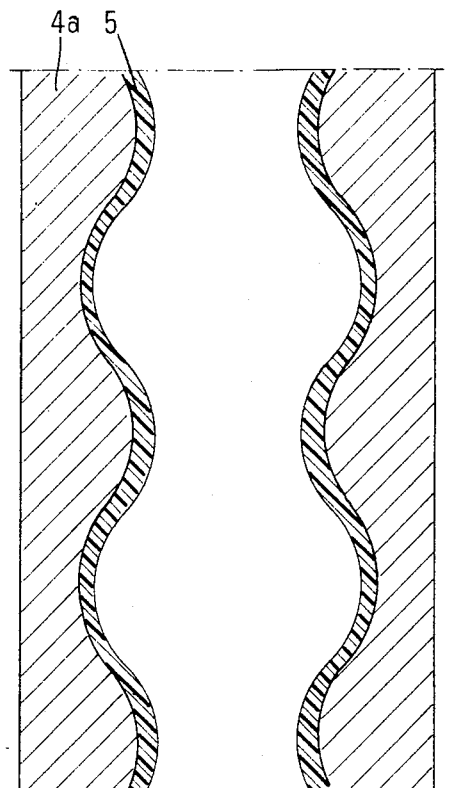
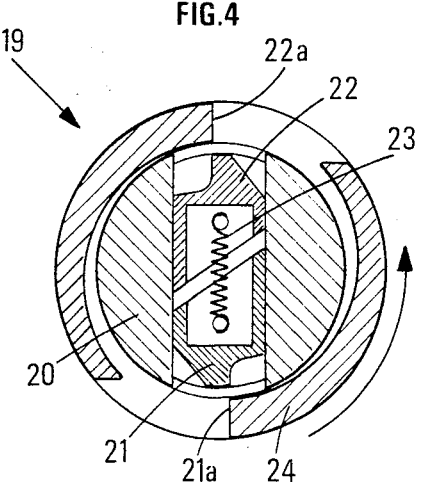

USABLE DEVICE, IN PARTICULAR FOR THE PUMPING OF AN EXTREMELY VISCOUS FLUID AND/OR CONTAINING A SIZEABLE PROPORTION OF GAS, PARTICULARLY FOR PETROL PRODUCTION

The present invention concerns a control process of a pump for the pumping of a fluid that is very viscous fluid and/or containing a considerable proportion of gas. It also concerns a device for implementing this process.

The prior art can be illustrated by the U.S. Pat. Nos. 4,370,098; 4,284,943 and 4,170,438, as well as by the French patent application 2.039.241.

The invention is more particularly adapted to petrol production, especially when the latter is very viscous and/or contains a considerable proportion of gas. This proportion is most frequently expressed by the volumetric gas/ liquid ratio or G.O.R. (Gas Oil Ratio) of the fluid to be pumped, measured in the temperature and pressure conditions prevailing at the bottom of the production well.

This application of the invention is not restrictive but will, however, be more closely examined hereinafter.

The exploitation of shallow and non-igneous wells can be made by means of surface pumps such as rod pumps or even by deep-well pumps such as centrifugal pumps or Moineau type helicoid pumps.

Rod pumps involve massive and expensive surface installations, unusable in a protected environment zone.

Their alternative action is testing for electric drive motors and moreover disturbs the free gas and emulsifies the fluid. It results in a low yield and the formation of gas locks capable of causing productivity loss.

Helicoid pumps of the Moineau type are currently employed for the transfer of surface petroleum fluids and we anticipate placing such pumps at the bottom of a petroleum production well in order to deliver crude petrol towards the surface.

The advantages offered by pumps designed according to the Moineau system and used as petrol production pumps are considerable :

pumping of very viscous fluids with a high gas content,
laminar and stable flow inside the pump without pulsation, the fluid is not emulsified and there is no formation of gas lock,
absence of valves which are points sensitive to wear and tear and are a source of dirt accumulation in rod pumps,
no operational difficulty in badly contorted wells, contrary to when rod pumps are employed,
precise adaptation of the well's production to the pump flow rate where this involves a volumetric pump and where the flow rate can be considered as proportional to the rotation speed,
constant and often very low load operation (balanced pump), high yield,
simple and sturdy construction,
considerably reduced surface equipment,
distinctly less maintenance required than for a rod pump.

Such a pump would be particularly advantageous on all heavy oil deposits containing gas and where flow rates are less than 100/200 m³ per day.

The aim of the invention is to realize a control process allowing for the automated and self-adaptable working of a rotary pump immersed in a fluid, especially when it is used as a subsurface pump for petrol production, such a control process enabling a constant yet adjustable dynamic submergence of the pump to be maintained.

A second aim of this invention is to provide a pumping system for implementing this process.

According to its first aim, the invention concerns a control process of a rotary pump immersed in a fluid produced by a well, the pump being rotary driven by a variable speed motor, this process being characterized in that it consists of acting upon the rotation speed of the motor according to the pressure difference $\Delta P$ which exists between the pressure of the fluid measured in the proximity of the pump and the well production pressure.

Moreover, according to this process, the pump rotation speed is increased when the difference $\Delta p$ is positive and reduced when the difference is negative until an equilibrium point is obtained where the difference is nil.

Preferably, the variation of pump speed according to the difference $\Delta p$ is linear.

In order to render this process self-adaptable, a control point is defined as regards the fluid pressure in the pump proximity, the process then being characterized in that, when the equilibrium point is obtained for a pressure greater than the control point pressure, the motor speed is increased at random for a certain time, then this speed is reduced according to the difference $\Delta p$ until the equilibrium point is obtained, this operation being repeated as often as is required until the equilibrium point corresponds to a pressure lower than the control point.

The well production pressure P is given by the formula :

$$P = P_G - Q/I_p$$

in which :
$P_G$ = pressure inside the unused deposit
$Q$ = pump flow rate according to the motor rotation speed
$I_p$ = well productivity indication According to its second aim, the invention concerns a device for the use of an immersed unit including a rotary pump connected to an electric motor. This device includes in combination at least one rotary pump, a motor driving this pump in rotation at a speed perceptibly proportional to the frequency of the electric current feeding this motor, and the means for effecting automatic adjustment of the flow delivered by the pump, such means including at least one pressure sensor carrying an electric measuring signal coupled at the level of dynamic submergence of the pump in service, and a set of electrical circuits for processing the measuring and control signal of the frequency of the current supplying the pump drive motor according to the value of the measuring signal.

The pump should preferably be a volumetric helicoid pump.

Figure 5:
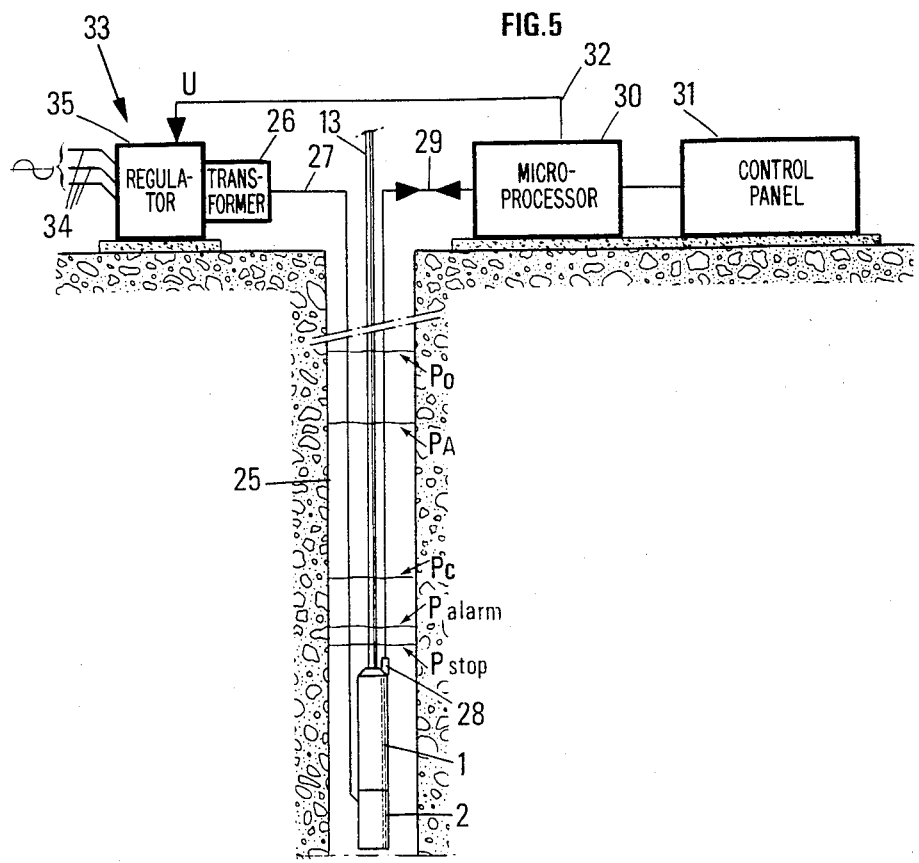
Figure 6:
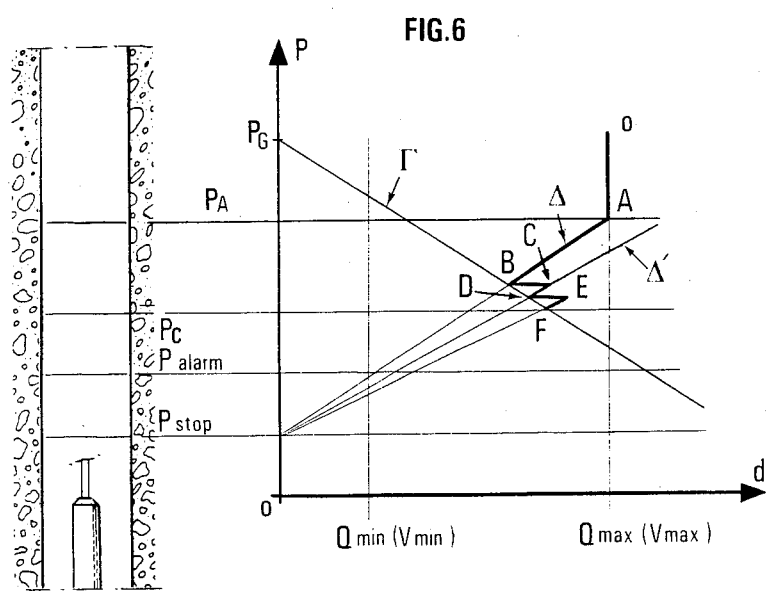

The invention will be best understood from the following description of an an embodiment, a description by no means restrictive with regard to the annexed drawings in which :

FIG. 1 shows a unit which can be used for the production of petrol and made up of a helicoid pump and an electric drive motor, FIG. 2 shows the stator of this pump, coated with elastomer, FIG. 3 is a diagrammatic representation of a pump formed from two helicoid type pumping components linked in a parallel manner, FIG. 4 diagrammatically illustrates a claw clutch situated between the pump and its drive motor, FIG. 5 diagrammatically represents the device according to the invention and placed inside a petrol well in production, and FIG. 6 is a diagram illustrating the working of the device.

The immersed motor-pump unit used in the device according to the invention includes from top to bottom (FIG. 1):

a hydraulic section 1, or pump, formed from components 1a and 1b linked in parallel fashion, an asynchronous electric motor 2 together with its oil reserve and compensation system.

The pump properly so-called is composed essentially:
of a rotor 3a and 3b formed of a circular section external spiral screw, precision made in high resistance steel,
of a stator 4a and 4b made up of an internal double screw in precision cast or machined steel and coated inside with an elastomer (FIG. 2) having characteristics of high resistance to mechanical wear and tear and the aggressive behaviour of petroleum fluids.

The rotor turning inside the stator generates cavities which remain in the same form when they progress from admission to delivery. It acts somewhat as a screw-conveyor. The imperviousness obtained between rotor and stator enables the fluid rising in the pump to be conserved in volume in the same way as it would be in a rod pump which would be in a continually ascending position.

By this principle, a pump is obtained which:
is reversible, self-priming,
is valveless,
has a uniform flow rate without pulsation or jerks of any sort,
is capable of transporting, without deterioration, very diverse products, from the most fluid to the most consistent.

FIG. 1 provides a diagram of the pump.

FIG. 2 represents, in section, a stator 4, the internal wall of which is coated with an optimized thickness of elastomer 5. This arrangement allows for:
a better dissipation of temperature throughout the stator,
a rigidity and profile dimensional stability,
a better volumetric yield, and
, a minimized swelling of the elastomer.

The rotor undergoes a special metallization treatment in order to:
minimize abrasion generated by the transportation of fluids loaded with solid particles, and
reduce the coefficient of rotor/stator friction.

The rotor axis moved out of center in relation to that of the pump, the rotor is connected to the motor shaft by a coupling generally made up of a connecting rod 6 and universal joints 7.

The hydraulic section of the pump principally consists of the rotor and the stator with admission at the base of the pump and delivery in front into a tubing.

One of the special features of such a pump is to generate excess pressures raised under a short length of the pump housing. For example, an excess pressure of 120 bars is obtained with a rotor/stator unit 1.20 m in length.

The pump housing can be conceived with a double length rotor/stator or with two rotor/stator units assembled in series. In this case, the excess pressure supplied will be doubled (240 bars inthe example indicated) for a given flow.

The pump can also be designed with two rotor/stator units assembled one above the other (FIG. 3) having opposing threads and connected by offset couplings 9.

In this case, admission is performed through the openings 10a and 10b placed at the two extremities and delivery through an opening 11 situated at the center of the pump of the channels 12 provided between the upper stator 4b and the housing, allowing the transfer of the fluid of the tubing 13 through a perforated tube 14 preventing debris from falling into the pump.

The two rotor/stator couplings 3a, 4a and 3b, 4b are provided with opposing threads (left and right) in the example illustrated by FIG. 3.

A safety valve 15 placed at the top of the pump 1 allows:
emptying and filling up of the tubing 13 during pump lifts and descents.
protection against excess loads, and
return of effluent pumped into the production well in case of insufficient influx or too high G.O.R.

The unit formed by the rotors and their coupling devices is supported by the pump housing 8 by means of a system of stops 16.

According to an advantageous embodiment the electric motor 2 intended to drive the pump is an asynchronous three-phase squirrel cage motor filled with oil.

The actual existing motors are four-pole motors their rotation speed being 1,500 revs/min when supplied with alternating electric current of 50 Hz frequency.

The realization of six pole motors can be envisaged.

In the case of a motor operating at the bottom of a petroleum well in production, it will be placed inequivalent pressure with the well fluid. This equivalent pressure retention can be obtained by means of two components (FIG. 1):
a protector 17 placed between the pump 1 and the electric motor 2,
an equalizer 18 connected to the lower part of the electric motor 2.

The protector 17 avoids intrusion into the motor of pumped effluent. An interface of clean fluid is established between the pump and the motor. The clean fluid is always kept at the pressure of the effluent by using a diaphragm device. This device also makes it possible to make up for possible losses of clean liquid which may occur. It is driven by the motor oil which is itself kept at the pressure of the effluent in the well by means of the equalizer 18.

A claw clutch 19 can be used to good advantage (FIG. 4) which enables the pump 1 to be started up for maximum torque of the motor 2. The centrifugal force separates the two claws 21, 22 of the motor shaft 20 from the action of the pull-back spring 23. The claws then interlock against two faces 21a and 22a respectively of the shaft 24 of the pump 1.

FIG. 5 diagrammatically represents the assembly of the device according to the invention, the unit made up of the pump 1 and its drive motor 2 being placed inside a petrol well 25 at the lower part of the tubing 13 through which flows the petrol delivered by the pump 1.

The electric motor 2 is electrically supplied beginning with a transformer 26 situated on the surface, by means of an electric power cable 27, the lower extremity 27a of which is connected to the motor 2 and is visible of FIG. 1.

At the top of the helicoid pump 1, a pressure and temperature sensor 28 is fixed which transmits electric measuring signals up to the surface by means of an electrical information transmission cable 29. The cable 29 is connected on the surface to processing circuits of the measuring signal or microprocessor 30, these circuits being electrically connected to a control panel 31.

The temperature and pressure sensor 28 is, for example, a sensor with high resolution strain gauges connected to base electrical circuits enabling signals to be delivered and which are representative of the pressure measured in the ring-shaped space of the sensor, this pressure being in direct relation with the intake pressure of the pump 1 (it only differs from this intake pressure by one constant). The bottom electronic circuits connected to the sensor 28 are also adapted to deliver signals representative of the temperature to which the sensor is subjected.

The electric signals representing respectively pressure and temperature could, for example, be transmitted on the surface by means of the cable 29 through frequency modulation of a bearer oscillation, the items of information corresponding respectively to the pressure and temperature being, for example, transmitted alternatively under the form of opposing polarity signals and which enables them to be clearly distinguished on the surface.

The cable 29 can be used not only for transmission of information emanating from the sensor 28, but also for the supply of the bottom electronic circuits to which this sensor is connected.

The microprocessor 30 transmits control signals u by means of the cable 32 to a frequency variator unit 33 which is three-phase current fed by the cable 34 connected to the electrical network with fixed frequency (50 or 60 Hz for example).

The frequency variator unit 33 consists of a regulator device 35 of the inverter type connected to the transformer 26 which, by means of the power cable 27, supplies the bottom electric motor with three-phase electrical current with adjustable frequency.

The signals delivered by the pressure and temperature sensor 28 and transmitted to the surface by the conductor cable 29 are processed by the microprocessor 30 which, beginning with these measuring and set value signals, sends to the frequency variator 33 a control signal u, the intensity of which may, for example, vary from between 0 and 10 volts.

The frequency variator 33 is adapted to supply the bottom motor 2 with electrical current, the frequency of which is proportional to the control voltage u, and the rotation speed of the motor 2 increases in proportion to the frequency of the power current which feeds it.

The microprocessor 30 includes circuits for memorizing a set value PC of the pressure at the sensor 28, this value corresponding to the submergence level desired for the pump 1 inside the well and control circuits, comparing this set point pressure to the real pressure $P_K$ measured in the well by the sensor 28 and transmitted to the microprocessor 30 by the cable 29 (this pressure is corrected so as to take into account the temperature value at the sensor 28, and the microprocessor 30 may indicate the value of this temperature).

The microprocessor 30 includes elaboration circuits of a control signal u and which are connected to the sensor 28 with the frequency variator 33.

If the comparison of values $P_K$ and $P_C$ by the microprocessor indicates that the level of the liquid in the ring-shaped space of the well 25 becomes higher than the desired pump submergence level, the microprocessor 30 is adapted, by means of the cable 32, to deliver to the frequency variator 33 a higher value voltage which increases the frequency of the power current supplying the motor 2 and afterwards increases the rotation speed of the motor 2/pump 1 unit. Conversely, if the level of liquid inside the well becomes lower than that corresponding to the set point pressure value $P_S$, the microprocessor 30 instructs the inverter 35 to supply the power cable 27 with a lower frequency electric current which reduces the rotation speed of the pump 1.

The adjustment keeps the pressure value measured in 28 between the value $P_C$ and a value $P_{Alarm}$ slightly lower.

The device thus consists of control means 30, 32, 33 regulating the rotation speed of the motor 2 by adjusting the frequency of the electric power current feeding this motor.

The pump 1 being volumetric, its flow rate is thus perceptibly proportional to the value of the control voltage u and this flow rate can be automatically adjusted to the well production flow rate.

In order to protect the inverter 35 of the frequency variator 33 from the start of excess currents, the device according to the invention includes electrical derivation means enabling the inverter 35 to be shunted to the start and the motor 2 to be directly supplied with three-phase electrical current supplied in 34 by the mains.

In these conditions, start of the pump 1 is carried out at its maximum speed $V_{Max}$ corresponding to its maximum flow rate.

In the hypothesis where the pump dimensioning is correct, the level of the liquid inside the well thus begins to diminish beginning with an initial level to which corresponds the value $P_O$ of the pressure measured by the sensor 28, prior to putting the regulation of the microprocessor 30 into operation, this action occurring when the level of liquid inside the well is lower than a value corresponding to a value Pa of the pressure measured by the sensor 28, this value, called "approach value", being memory-stored inside the microprocessor 30. The values $P_C$, $P_{C\ Max}$, $P_K$ and $P_A$, as well as the other pressure values defined below, can be read on the control panel 31.

Refer hereafter to the graph of FIG. 6 on which can be read in abscissae the flow rate of the pump 1 which can vary between the value $Q_{min}$ corresponding to its minimum rotation speed $V_{min}$ and the value $Q_{Max}$ corresponding to the maximum rotation speed $V_{Max}$ of this pump. We can bring in ordinate onto this graph the value P of the pressure measured at the sensor 28, this value being linked to the liquid height above the level of this sensor.

The characteristic flow rate of a production well is :

$$Q_1 = I_P(P_G - P) \quad (1)$$

where $Q_1$ is the well flow rate $I_p$ is the well productivity indication (this indication varies slightly over the course of time and it is conceded that it is constant throughout the life of a pump)

$P_G$ is the pressure in the unused deposit, that is, the pressure of the fluid contained in the deposit when the deposit is at rest, i.e., when there is no production; and P is the pressure prevailing in the well at the level of the exploited geological bed ($P=P_K+\rho g h$, if $P_K$ is the pressure measured by the sensor 28 situated at a height h above the bed and $\rho$ the specific density of the fluid in the well, g being the acceleration of gravity).

The pump 1 being volumetric, its characteristic is:

$$Q_2 = kV, \qquad (2)$$

where
  $Q_2$ is the pump flow rate
  V its rotation speed and
  k is the meter constant.

The level in the well is stable if the values $Q_1$ and $Q_2$ given by the equations (1) and (2) above are equal, i.e. if $$P = P_G k V / I_P$$

The submergence level of the pump by the liquid filling the ring-shaped space of the well is therefore directly linked to the rotation speed V of the pump 1 and may be kept constant at the desired value, despite possible variations of $P_G$, k and $I_p$.

However, for a proper use of the pump 1, its rotation speed V is limited by the two values $V_{min}$ and $V_{Max}$.

Two other pressure values are memory-stored in the microprocessor, in particular:

P alarm: pressure below which an alarm is set off (falling of the level too great inside the well), P stop: pressure at which the microprocessor instructs the pump to stop.

The respective levels corresponding to the different pressure values defined above are shown on the diagram of FIG. 5.

On the graph of FIG. 6, the curve $\Gamma$, perceptibly rectilinear, is the characteristic well production curve, visibly defined by the equation $$P = P_G - kV/I_P P_G Q/I_P$$

The microprocessor 30 is adapted to control the working of the pump in the following manner (FIG. 6):

PHASE 1

Start of the pump at maximum speed, then at maximum flow through connection of the power cable 27 directly to the network 34.

The level of liquid in the well drops and the pressure $P_K$ measured by the sensor 28 reduces as far as $P_A$.

The segment O - A is described on the graph of FIG. 6.

When the pressure $P_A$ is reached, the microprocessor 30 controls the passage to the following working phase.

PHASE 2

The microprocessor 30 determines the straight line $\Delta$ joining the point of coordinate (Q=0; P=P stop) to point A; then, by means of the signal u applied to the frequency variator 33, it controls the decrease in pump rotation speed in such a way as to change position following the working point $\Delta$(FIG. 6). Thus one reaches the stable B working point situated on the curve $\Gamma$ where the pump flow rate is equal to the flow rate of the well. This phase takes place through successive steps and requires the elaboration of a stability criterion.

PHASE 3

The point B is not inside the desired zone between $P_C$ and $P_{Alarm}$. The microprocessor increases the pump rotation speed value with a given quantity and defined beforehand (e.g. 200 revs/min). Just as it did in phase 2 preceding, the microprocessor controls the decrease in pump rotation speed in such a way as to change position according to the new linear velocity line working point $\Delta'$. Thus an equilibrium point C is reached and phases B and C (points D, E ... F) are repeated until a stable working point F is obtained in the gap between $P_C$ and $P_{Alarm}$.

When the production characteristics vary (clogging, wear and tear), the pressure $P_K$ may go out of the zone $P_C$, $P_{Alarm}$. The control then reassumes its rôle in order to find a new stable working point inside the gap ($P_C$, $P_{Alarm}$).

In the realization mode described, the pump employed was a volumetric helicoid pump whose flow rate could be considered as proportional to the rotation speed. However, the invention is applicable to any type of pump whose flow rate would not be proportional to the speed. It is therefore sufficient to consider that the linear velocity lines $\Delta$ and $\Delta'$ are replaced by curves giving the flow rate according to the motor rotation speed.

We claim:

1. A pumping device, especially for pumping of a very viscous fluid containing a sizeable proportion of gas, particularly for the production of petrol, the pumping device comprising a unit immersed in the fluid, said unit including at least one delivery pump coupled to an electric drive motor, the delivery pump having at least one admission opening and one opening communicating with a fluid delivery pipe, characterized in that the pumping device includes at least one volumetric helicoid rotary pump and a motor for driving the helicoid rotary pump at a speed substantially proportional to a frequency of an electric current feeding the motor, and means for automatically adjusting a flow delivered by the helicoid rotary pump, said adjusting means comprising at least one pressure sensor means for deliverying an electric measuring signal linked to a dynamic submergence level of the helicoidal rotary pump in service and a set of electrical circuit means for determining a production pressure from a flow rate of the helicolidal rotary pump and for processing a measuring and control signal of the frequency of the current supplying the drive motor of the helicoidal rotary pump in accordance with a determined pressure differential of said measuring signal and said production pressure.

2. A device according to claim 1, characterized in that the device further includes means for measuring a temperature at a level of said sensor.

3. A device according to one of claims 1 or 2, characterized in that the set of electrical circuit means comprises circuits for a memory storage of a set value pressure representative of a dynamic submergence level ($P_C$) determined for the pump and control means for governing the rotational speed of the drive motor of the pump through adjustment of the frequency of the current supplied to the drive motor.

4. A device according to claim 3, characterized in that said set of electrical circuit means includes circuits for an elaboration of a control signal (u), said circuits being connected to said pressure sensor means and to a frequency variator circuit comprising a regulator means for delivering to the drive motor an electric power current whose frequency depends upon the value of the control signal (u).

5. A device according to claim 3, characterized in that said set of electrical circuit means is adapted to be temporarily switched off at the start, the regulator means triggering the feeding of the drive motor with an electric current, the frequency of which substantially corresponds to the maximum rotational speed of the pump and comprises circuits for the memory storage of a threshold value or approach value ($P_A$) triggering an initiation of the operation of said regulator means.

6. A control process of a rotary expansible chamber pump immersed in a fluid produced by a well, the pump being rotary driven by a variable speed motor, characterized in that the process comprises determining a pressure differential $\Delta p$ existing between a pressure of the fluid measured in a proximity of the rotary pump and a production pressure P of the well, with the production pressure P of the well being determined in accordance with the following relationship:

$$P = P_G - Q/I_p,$$

wherein:

$P_G$ = pressure of the fluid contained in the well;

Q = pump flow rate according to the rotational speed of the motor; and $I_p$ = well productivity indication; and controlling a rotational speed of the variable speed motor in accordance with the determined pressure differential for enabling an automatic control of the rotary pump.

7. A control process of a rotary expansible pump according to claim 6, characterized in that the process further comprises increasing the a rotational speed of the rotary pump when the pressure differential $\Delta p$ is positive and reducing the rotational speed of the rotary pump when the pressure differential is negative until an equilibrium point is obtained at which time the pressure differential is nil.

8. A control process of a rotary expansible pump according to claim 7, characterized in that a rotational speed of the rotary pump determined in accordance with the pressure differential $\Delta p$ is substantially linear.

9. A control process of a rotary expansible pump according to claim 7, in which a set value is defined for the pressure of the fluid in the proximity of the rotary pump, characterized in that when the equilibrium point is obtained for a pressure greater than the set value pressure, the rotational speed of the motor is increased for a predetermined time, then this speed is reduced according to the pressure differential $\Delta p$ until the equilibrium point is obtained, this operation being repeated as often as necessary in order that the equilibrium point corresponds to a pressure which is lower than the set value.

* * * * *